United States Patent [19]

Kimura et al.

[11] 4,039,481

[45] Aug. 2, 1977

[54] CATALYST CARRIER AND METHOD OF MANUFACTURING SAME

[75] Inventors: Sadahiro Kimura; Kiyoshi Uchida; Hiroyuki Akizuki, all of Toyota, Japan

[73] Assignee: Toyota Jidosha Kogyo Kabushiki Kaisha, Toyota, Japan

[21] Appl. No.: 568,550

[22] Filed: Apr. 16, 1975

[30] Foreign Application Priority Data

Apr. 20, 1974 Japan .............................. 49-044660

[51] Int. Cl.$^2$ ...................... B01J 21/04; B01J 23/22; B01J 23/24; B01J 23/74
[52] U.S. Cl. ................................. 252/464; 252/463; 252/465; 252/466 J
[58] Field of Search .................... 252/463, 466 J, 464, 252/465

[56] References Cited

U.S. PATENT DOCUMENTS

| | | | |
|---|---|---|---|
| 2,474,440 | 6/1949 | Smith et al. | 252/463 X |
| 3,340,011 | 9/1967 | Hoekstra et al. | 252/463 X |
| 3,428,575 | 2/1969 | Pijpers et al. | 252/466 J |
| 3,701,822 | 10/1972 | Negra et al. | 423/213.5 |

FOREIGN PATENT DOCUMENTS

| | | | |
|---|---|---|---|
| 1,009,609 | 11/1965 | United Kingdom | 423/213.5 |

*Primary Examiner*—W. J. Shine
*Attorney, Agent, or Firm*—Brisebois & Kruger

[57] ABSTRACT

The present invention relates to a catalyst carrier characterized by the fact that it comprises a substance which promotes a transition to α-alumina, which substance is located near the surface of a carrier composed mainly of alumina and which carrier is subjected to a heat treatment under appropriate conditions, thereby causing the transition of said alumina to α-alumina, with those pores near the surface made larger in diameter than those pores located more deeply within the carrier. The invention also includes a method of manufacturing said catalyst carrier.

11 Claims, 2 Drawing Figures

F I G. 2
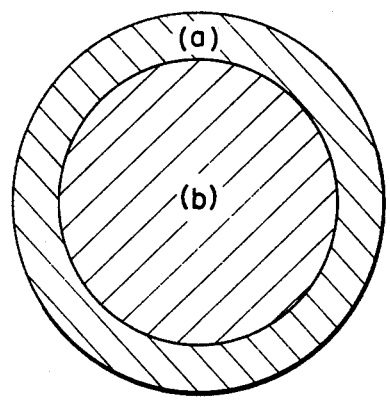

CATALYST CARRIER AND METHOD OF MANUFACTURING SAME

BACKGROUND OF THE INVENTION

Generally a catalyst is evaluated not only in items of its activity but also in terms of its useful life. A catalyst, even though excellent in activity, is practically useless if it has a short life. It is also useless if it is easily breakable and therefore short in mechanical life.

Usually for the manufacture of a high-activity, long-life catalyst, a catalyst carrier is required to meet many conditions. For instance, to be usable in an exhaust gas purifying catalyst device for rendering harmful elements contained in auto engine emission gases such as carbon monoxide, unburnt hydrocarbons and nitrogen oxides harmless, the catalyst is required to meet the following conditions.

First, since the temperature in the engine during combustion becomes higher than 800° C, the catalyst used must be one that exhibits only a small decrease in activity even at high temperatures. Besides, it must be strong enough to withstand the vibrational forces generated in auto operation.

Automotive fuel containing chemical compounds such as lead, sulphur and phosphorus naturally produces exhaust gases containing lead compounds, sulphur compounds and phosphorus compounds. It is equally natural that since the lubricating oil for the internal combustion engine containing phosphorus compounds or the like which is, in most cases, burned in the internal combustion engine, the exhaust gas also contains elements attributable to the lubricating oil. Among others, the lead compounds, the sulphur compounds and the phosphorus compounds are commonly found harmful to the catalyst. Therefore the catalyst is required to have an adequate resistance to these harmful substances.

Generally speaking, the mechanical strength and the above-mentioned resistance to the harmful substances contained in the exhaust gas depend largely on the carrier for the catalyst. For this reason the carrier for the exhaust gas purifying catalyst has to be strong enough to resist both thermal shock and mechanical vibration and also sufficiently resistant to the harmful contents of the exhaust gas.

SUMMARY OF THE INVENTION

The present invention provides a catalyst carrier which is mechanically as strong as the conventional carrier and sufficiently resistant to the harmful contents of the exhaust gas, said catalyst carrier consisting of alumina or being mainly composed of alumina with the alumina grains near the surface being larger so that the pores between said grains near the surface have a larger diameter than those pores located more deeply within the carrier.

BRIEF DESCRIPTION OF THE DRAWING

FIG. 2 is an enlarged sectional view for illustrating the carrier according to the present invention wherein (a) is Fe compound-containing layer and (b) is a layer which does not contain Fe compound.

DETAILED DESCRIPTION OF THE INVENTION

Figure 1:
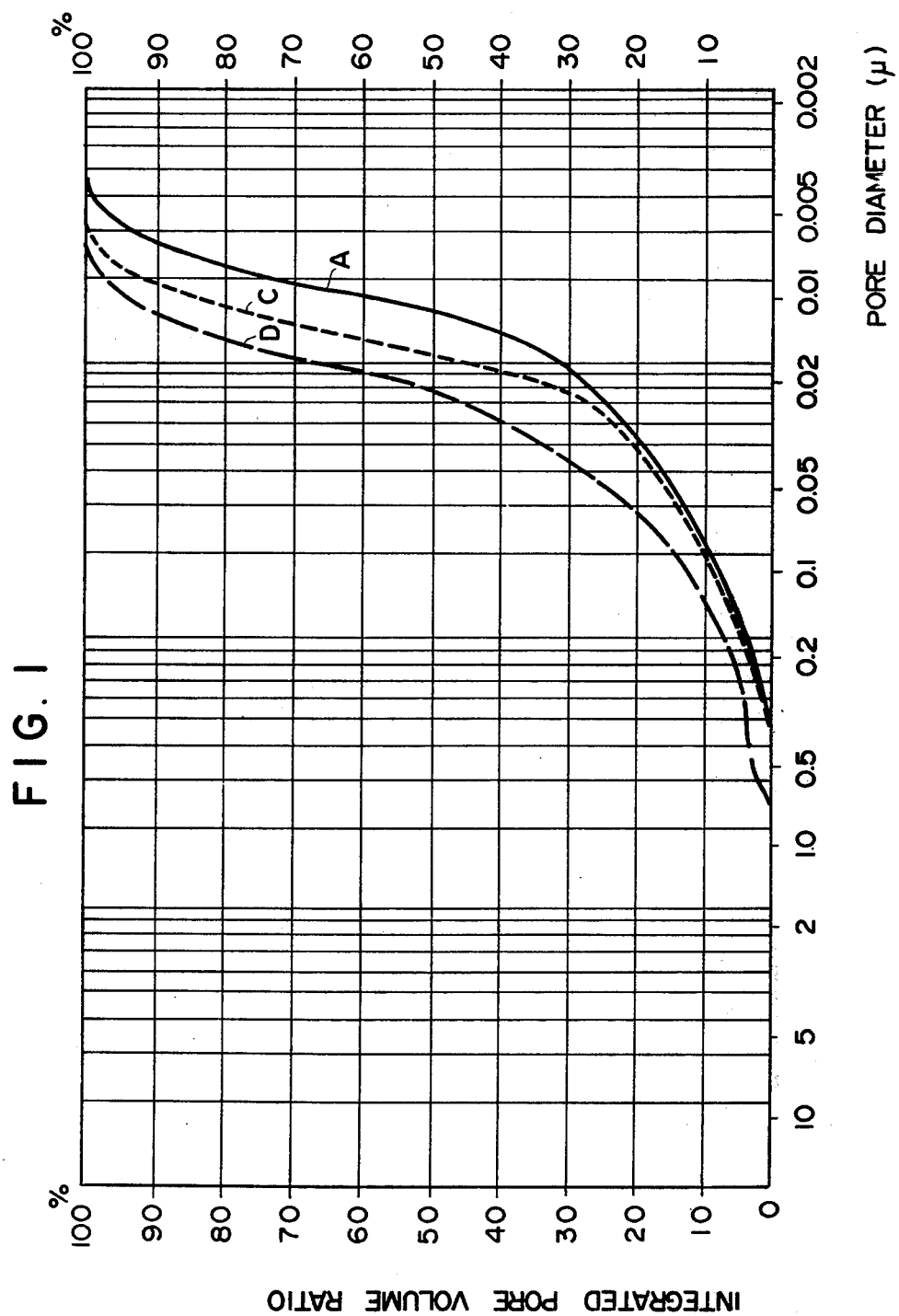
FIG. 1 shows the distribution of pores in carrier D of Example 2, according to the present invention, in a conventional carrier A, and in the carrier C of Comparative Example 1.

The present invention relates to a catalyst carrier and to a method of manufacturing it. Alumina is the material most commonly used as the carrier for the catalyst used in the purification of automobile engine emissions.

So far, many proposals have been made with respect to an alumina carrier composed mainly of alumina and an active alumina, but they have failed to provide satisfactory solutions to the above-mentioned problem.

For instance, Smith et al, in the specification of their U.S. Pat. No. 2,422,172, state that oxides of Cr, Mn, Fe, Mo and Co can promote the thermal transformation of $\gamma$-alumina into $\alpha$-alumina. Furthermore, they suggest the reaction of active aluminas with a certain kind of alkaline earth compound to suppress this tendency for active alumina to be transformed into a phase of higher density by thermal transformation. A large number of similar proposals and studies have been made. For example, the specification of Japanese Patent Applications laid open to the public under the numbers Sho 48-14600 and Sho 48-17467 say that, by reaction with a certain kind of rare earth compound, active aluminas can be prevented from turning into a phase of higher density.

When, however, the above-mentioned compounds are added to alumina and the alumina grain growth is accelerated through heat treatment at high temperatures, for instance when Fe compound is added thereto, the pore diameter increases, as indicated in FIG. 1, but this is accompanied with a tendency for the crushing strength of the alumina to decrease, which results in poor durability. If an alkaline earth compound or a rare earth compound is added to prevent the tendency of alumina to turn into a phase of higher density, the decrease in the crushing strength will not be great. A carrier with its mechanical strength increased by the addition of such compounds or by a reduction in the pore diameter, when used to carry an automotive exhaust gas purifying catalyst, will cause a greater decrease in the catalyst performance than a carrier of low strength, i.e., one with a large pore diameter. Elaborate, extensive research undertaken by the present inventors has revealed that such performance drop, is caused by the harmful contents of the exhaust gas.

From this it follows that in order to increase its mechanical strength, the catalyst carrier has to be composed of fine alumina grains. This means that an alumina with a wider specific surface area is used and this is effective for increasing the dispersion of the metal carried and the durability of the catalyst. As stated before, however, when this kind of carrier is used to carry the catalyst, there is a substantial drop in the activity of the catalyst due to the harmful contents of the exhaust gas.

After full investigation of carriers for automotive exhaust gas purifying catalysts, the present inventors have succeeded in inventing a catalyst carrier with ample mechanical strength, which also assures ample resistance of the catalyst to the above-mentioned harmful contents of the exhaust gas, by making the diameter of those pores near the surface larger than that of those pores located more deeply inside, thereby increasing the specific surface area of the internal alumina.

The features of the catalyst carrier according to the present invention are that the conflicting relationship, traced to a carrier which is made of alumina or consists mainly of alumina, between the crushing strength and the resistance to the harmful contents of the exhaust gas has been overcome. Its strength is also satisfactory; ample resistance of the catalyst to the harmful contents of the exhaust gas is assured; and the heat resistance too is enhanced, thereby assuring a long life for the catalyst.

The present invention has been brought about by adding to the surface of the carrier a compound which can promote the transition of $\gamma$-alumina to $\alpha$-alumina as a means of enlarging the diameter of the surface pores by accelerating the alumina grain growth near the surface through heat treatment under the conditions that permit the transition of the $\gamma$-alumina near the surface to $\alpha$-alumina.

More specifically, the present invention provides a catalyst carrier with $\gamma$-alumina as its main component, which contains near its surface a compound which promotes the transition to $\alpha$-alumina, said catalyst carrier being fired under conditions permitting the transition of surface $\gamma$-alumina to the $\alpha$-phase with the result that the pore-growth of the surface alumina becomes faster than that of the internal alumina, so that the diameter of the surface pores becomes larger than that of the internal pores.

In the present invention, Fe compounds are preferable as an additive to alumina which is cheap, low in secondary public hazard and sufficiently effective for attaining the object of the present invention, but it is apparent that compounds of Cr, Mn, Mo, Cu, W, Ti, and V which can promote transition of alumina to $\alpha$-alumina may also be used.

As the first step toward attaining the above-mentioned carrier, there are various methods for introducing the Fe compound near the surface of a carrier of alumina or composed mainly of alumina.

For instance, there is a method for obtaining a carrier easily by contacting a carrier which has been impregnated in advance with a solution containing ammonia water or hydroxides such as NaOH, KOH, BaOH, carbonates such as $Na_2CO_3$, $NaHC_3$ or sulfides such as $(NH_4)_2S$, $H_2S$ and the like or a carrier which has been subjected to drying if necessary, with a solution containing Fe compound.

Any Fe compound is suitable so long as it can be deposited near the surface of the carrier. It may be, for instance, a mineral acid salt such as a nitrate or a sulfate; a chloride; a double salt such as Mohr's salt and iron alum; or an organic acid salt such as an acetate.

Numerous other methods can be used for introducing the Fe compound near the surface of carrier, for instance, such methods as spraying a solution or gas containing an Fe compound against the carrier, or coating the alumina carrier with an alumina layer containing an Fe compound.

Further, the inclusion of an Fe compound near the surface of the carrier is not limited to a use of a previously molded carrier. For instance, representative methods for adding Fe compound well-known to persons skilled in the art include: the formation of an alumina gel, agglomeration, extrusion and pelletization, through which alumina can be given a desired shape or size, or the Fe compound addition may be carried out in such a process of making a carrier as in the process of dripping in oil.

The present invention can be accomplished by firing an alumina carrier or a carrier mainly composed of alumina, into which an Fe compound has been introduced to a depth of less than 400$\mu$ from the surface, under conditions permitting the iron-coating alumina layer to turn into the $\alpha$-phase.

The Fe component of the carrier according to the present invention is ultimately solid-solutioned in the form of $Fe^{++}$, $Fe^{+++}$ etc. or is present in the form of an oxide.

In the following examples the present invention will be concretely described, but these examples are representative rather than exhaustive.

EXAMPLE 1

A commercially available active alumina carrier (a product of the Sumitomo Chemical Industry Co., composed mainly of X alumina; hereinafter called carrier A) was immersed in a 0.5 N ammonia water solution for 3 minutes, after which excess solution was removed. The carrier A was then immersed in an aqueous solution containing ferrous chloride in the proportion of 0.2 mole/l for 5 minutes, followed by washing with water and drying at 120° C. Next, a 5-hour heat treatment at 900° C was carried out in order to produce the desired carrier, which will be called carrier B. The Fe compound-containing layer of carrier B extends about 30$\mu$ inward from the carrier surface. X-ray diffraction revealed $\alpha$-alumina in the alumina of the Fe compound-containing layer, but no $\alpha$-alumina was found in the alumina of the deeper layer having no content of Fe compound.

COMPARATIVE EXAMPLE 1

The same carrier A as used in Example 1 was heat-treated at 900° C for 5 hours, yielding the carrier C.

No $\alpha$-alumina was found in the carrier C.

COMPARATIVE EXAMPLE 2

The same carrier A as was used in Example 1 was immersed in an aqueous solution containing ferric nitrate in the proportion of 1 mole/l for 1 hour, followed by the removal of excess solution, drying at 120° C and then a 5-hour heat treatment at 900° C, thereby yielding the carrier D. Carrier D was found to contain the Fe compound practically to its core, with $\alpha$-alumina being revealed by X-ray diffraction.

By introducing mercury under pressure, the distribution of pores was measured in the case of the carriers A, C and D, the results being summarized in FIG. 1.

In FIG. 1 the ordinate is the pore volume ratio (%) and the abscissa the pore diameter. The pore volume ratio is calculated as follows:

$$\text{Pore volume ratio} = Vp/Vt \times 100\ (\%)$$

where $Vp$ (in cc) = Volume of mercury introduced up to each measuring point (pore diameter)

$Vt$ (in cc) = total volume of mercury introduced into the poes at the end of the measurement From FIG. 1 it is seen that the carrier D which contains an Fe compound and has been heat-treated tends to have a larger pore diameter because of the Fe compound.

The crushing strengths of said carriers A, B, C and D were also measured with the results summarized in Table 1.

TABLE 1

| Carriers | Crushing Strength (Kg/grain) |
|---|---|
| A | 12 |
| B | 9 |
| C | 11 |
| D | 3 |

From Table 1 it is found that in the carrier B with a controlled thickness of the Fe compound-containing layer, the drop in the mechanical strength which occurs when the content of the Fe compound extends throughout the carrier can be considerably prevented and the carrier performance can be maintained nearly the same as in a conventional carrier.

Next, an example of practically testing a catalyst carried in the carrier of the present invention is illustrated.

TEST 1

Carriers A and B were immersed in an aqueous solution acidified by nitric acid, of acidic palladium nitrate-chloroplatinic acid containing Pd at a rate of 2 g/l and Pt at a rate of 1 g/l for 20 minutes, followed by the removal of excess solution, drying at 120° C, a 2-hour reduction with hydrogen at 500° C, repeated washing with water and drying at 120° C, thereby yielding an alumina-carried platinum-palladium catalyst. The catalyst obtained using the carrier A is defined as Catalyst A and the one obtained using the carrier B is defined as Catalyst B.

Catalysts A and B were subjected to a durability test with accelerated exposure to catalyst poisons. This durability test was carried out to investigate the resistance of the catalyst to the harmful contents of the exhaust gas, using a gasoline containing Pb 0.6g/U.S. gallon and P 0.10g/U.S. gallon and a real engine under the following conditions:

Space velocity: 75,000 - 90,000 ml/hr per ml of catalyst carried.
Catalyst bed temperature: 800° C
Duration: 50 hours
Atmosphere: $CO/O_2$ = 0.5 - 8%, CO = 1.2% approx.

The results of a propane oxidation activity test and a CO oxidation activity test carried out with catalysts A and B before and after the above-mentioned accelerated exposure to catalyst poisons are summarized in Table 2.

In the present invention the propane oxidation activity test was invariably executed under the following conditions:

Space velocity: 18,000 ml/hr per ml of catalyst.
Reactor temperature: 400° C
Supplied gas: $C_3H_8$ — 570 ppm, CO — 1.2%, air — balance.
Analyzer: Hydrocarbon analyzer The rate of propane purification was calculated as follows:

Rate of propane purification = $[(X - Y)/X] \times 100$ (%)

where
X: initial concentration of propane
Y: residual concentration of propane after passing through catalyst bed of about 400° C.

In the present invention the CO oxidation activity test was invariably executed under the following conditions:

Space velocity: 30,000 ml/hr per ml of catalyst carried.
Incoming gas temperature: 275° C
Supplied gas: CO — 2.5%, air — balance.
Analyzer: CO-tester.

The rate of CO purification was calculated as follows:
Rate of CO purification = $[(W - V)/W] \times 100$ (%)
where
W: initial concentration of CO
V: residual concentration of CO after 8 minutes' gas supply

TABLE 2

| Catalysts | Rate of propane Purification (%) | | Rate of CO Purification (%) | |
| --- | --- | --- | --- | --- |
| | Before durability test | After durability test | Before durability test | After durability test |
| A | 96 | 42 | 100 | 67 |
| B | 96 | 70 | 100 | 94 |

Table 2 shows that the catalyst B using the carrier B of the present invention shows a higher rate of purification after the durability test than the catalyst A using the carrier A for comparison.

Putting together the results of the tests summarized in Tables 1 and 2, it appears that the carrier of the present invention is mechanically as strong as the conventional carrier and has a higher resistance to the harmful contents of the exhaust gas than the conventional carrier.

EXAMPLE 2

A commercially available active alumina carrier (a product of Rhone-Prozil; composed mainly of γ-alumina; hereinafter called the carrier E) was immersed in a 0.4 N ammonia water solution of 3% hydrogen peroxide for 5 minutes, after which excess solution was removed from the carrier E. This was followed by a 5-minute immersion in an aqueous solution of ammonium ferrous sulfate at a rate of 0.5 mole/l, washing with water, drying at 120° C and then a 2-hour heat treatment at 1100° C, thereby yielding the desired carrier, which will be called carrier F. The Fe compound-containing layer in the carrier F extended to a depth of about 110μ from the surface, with most of the Fe-containing alumina turned into α-alumina; in the deep part containing no Fe compound, however, only a little α-alumina was found.

EXAMPLE 3

After the heat treatment in Example 2 was carried out at 1000° C for 2 hours, a desired carrier was produced which will be called carrier G. The Fe compound-containing layer of the carrier G was extended about as far inward as in the carrier F, that is, it reached a depth of about 110μ. α-alumina was found in the alumina of the Fe-compound containing layer, but practically none was found in the alumina of deeper layers.

EXAMPLE 4

After the heat treatment in Example 2 was carried out at 1100° C for 5 hours, a desired carrier was produced which will be called carrier H. The Fe compound-containing layer of carrier H was nearly the same as in carrier F, that is, it reached a depth of about 110μ from the surface. Practically all alumina in the Fe compound-containing layer turned out to be α-alumina and the alumina in the deeper layers was also α-alumina.

EXAMPLE 5

After treatment similar to Example 2 with the normality of the ammonia water solution containing hydrogen peroxide set at 0.5 N and the heat treatment carried out at 1100° C for 1 hour, a desired carrier was produced, which will be called carrier I.

The Fe compound-containing layer of the carrier I extended to a depth of about 50μ from the surface, and practically all alumina in the Fe compound-containing layer turned out to be α-alumina. Even in the deeper layer containing no Fe compound, α-alumina was found.

The measured crushing strength of the carriers E, F, G, H and I are listed in Table 3.

TABLE 3

| Carriers | Crushing Strength (Kg/grain) |
|---|---|
| E | 7 |
| F | 8 |
| G | 8 |
| H | 7 |
| I | 7 |

From Table 3 it is found that the carrier according to the present invention is equal in mechanical strength to a conventional carrier.

Using these carriers, in the same way as in Test 1, the propane oxidation activity and the CO oxidation activity before and after the accelerated exposure to catalyst poisons were measured.

TEST 2

Catalysts E to I were produced by impregnating the carriers E, F, G, H and I with palladium to a depth of 200μ from the surface by using palladium chloride. Carriers and catalysts are matched in code, with the carrier E matching the catalysts E, for example.

The results of a propane oxidation activity test and a CO oxidation activity test carried out with catalysts E, F, G, H and I before and after the accelerated exposure to catalyst poisons are summarized in Table 4.

TABLE 4

| Catalysts | Carriers used | Rate of propane purification (%) | | Rate of CO purification (%) | |
|---|---|---|---|---|---|
| | | Before durability test | After durability test | Before durability test | After durability test |
| E | E | 95 | 30 | 99 | 32 |
| F | F | 97 | 69 | 99 | 97 |
| G | G | 96 | 65 | 99 | 91 |
| H | H | 97 | 72 | 99 | 96 |
| I | I | 99 | 70 | 99 | 97 |

Table 4 shows that the catalysts corresponding to the carriers F, G, H and I of the present invention excel the compared carrier E with respect to these rates of purification after the test.

Summing up the results in Tables 3 and 4, it is found that the carrier according to the present invention is comparable in mechanical strength to a conventional carrier, but with respect to its resistance to the harmful contents of exhaust gas, it is superior to a conventional carrier, eliminating the latter's short-comings.

Next, the results of the percentages for Fe compound content and for metal catalyst with regard to each of the catalyst used in Tests 1 and 2 are tabulated in Table 5.

Table 5

| Carrier used | | Catalyst | | |
|---|---|---|---|---|
| | Fe content (%) | | Fe content (%) | Pd content (%) | Pt content (%) |
| A | — | A | — | 0.18 | 0.09 |
| B | 0.13 | B | 0.13 | 0.18 | 0.09 |
| E | — | E | — | 0.12 | — |
| F | 0.18 | F | 0.18 | 0.12 | — |
| G | 0.18 | G | 0.18 | 0.12 | — |
| H | 0.17 | H | 0.17 | 0.12 | — |
| I | 0.12 | I | 0.12 | 0.12 | — |

Further, to explain about the carrier according to the present invention, FIG. 2 is a cross-section of the carrier cut through the centre thereof in order to illustrate the carrier of the present invention.

In the figure, (a) shows a Fe compound-containing layer while (b) shows a layer which does not contain Fe compound. The present invention comprises having the pore diameter of the layer (a) larger than that of the layer (b).

Table 6

| Carrier | Pore Diameter (μ) at 50% integrated pore volume ratio | | |
|---|---|---|---|
| | (a) layer | (b) layer | Average |
| B | 0.03 | 0.01 | 0.02 |
| F | 0.14 | 0.10 | 0.11 |
| G | 0.07 | 0.03 | 0.04 |
| H | 0.17 | 0.12 | 0.14 |
| I | 0.07 | 0.03 | 0.04 |

From Table 6, it is seen that all the carriers according to the present invention have larger pore diameter in the layer (a) than the layer (b) at a 50% integrated pore volume ratio.

What is claimed is:

1. A method of increasing the effective life of a catalyst carrier consisting mainly of alumina, which method comprises the step of introducing into only a surface layer of said carrier a compound which promotes the transformation of alumina only in the surface layer into α-alumina and then heat-treating said carrier at a temperature to produce said transformation.

2. A method as claimed in claim 1, wherein said compound is an iron compound.

3. A method as claimed in claim 2, wherein said iron compound is selected from the group consisting of chlorides, mineral acid salts, double salts, and organic acid salts.

4. A method as claimed in claim 1, wherein said compound is added by immersing the catalyst carrier in a solution of said compound.

5. A method as claimed in claim 1, wherein said compound is added by spraying a gas containing said compound against said catalyst carrier.

6. A method as claimed in claim 1, wherein said compound is added by forming the surface of the catalyst carrier from pelletized alumina powder containing said compound.

7. A method as claimed in claim 4, wherein the carrier is first immersed in a solution of a compound for facilitating the deposition of the alumina transformation compound near the surface of the carrier and then immersed in said solution of an iron compound.

8. A method as claimed in claim 7, wherein a pretreating solution for facilitating the deposition of said alumina transformation compound is applied to said surface layer, said pretreating solution being selected from the group consisting of ammonia water, a solution containing hydroxides, a solution containing carbonates, and a solution containing sulfides.

9. Catalyst carrier having a surface layer consisting mainly of α-phase alumina, and a remaining inner portion consisting mainly of γ-phase alumina, so that the pores in the surface layer are larger than those in said inner portion.

10. The catalyst carrier of claim 9 in which said surface layer comprises an iron-containing compound, but said inner portion is substantially iron-free.

11. The method of claim 1, in which alumina transforming compound is selected from the group consisting of Fe, Cr, Mn, Mo, Cu, W, Ti and V compounds.

* * * * *